US007684565B2

(12) United States Patent
Medvinsky

(10) Patent No.: US 7,684,565 B2
(45) Date of Patent: Mar. 23, 2010

(54) SYSTEM FOR SECURELY COMMUNICATING INFORMATION PACKETS

(75) Inventor: Alexander Medvinsky, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 897 days.

(21) Appl. No.: 09/765,108

(22) Filed: Jan. 16, 2001

(65) Prior Publication Data
US 2002/0094081 A1 Jul. 18, 2002

(51) Int. Cl.
H04L 9/00 (2006.01)
(52) U.S. Cl. .................... 380/44; 380/255; 713/168
(58) Field of Classification Search ............ 370/316, 370/351, 352, 353, 354; 380/48, 43, 49, 380/44, 255; 455/411; 713/168
See application file for complete search history.

(56) References Cited

U.S. PATENT DOCUMENTS

| 5,081,679 | A | * | 1/1992 | Dent | 380/272 |
| 5,241,597 | A | * | 8/1993 | Bright | 380/286 |
| 5,243,653 | A | * | 9/1993 | Malek et al. | 380/272 |
| 5,278,907 | A | * | 1/1994 | Snyder et al. | 380/274 |
| 5,307,370 | A | * | 4/1994 | Eness | 375/135 |
| 5,426,643 | A | * | 6/1995 | Smolinske et al. | 370/506 |
| 5,594,429 | A | * | 1/1997 | Nakahara | 340/5.26 |
| 5,940,508 | A | * | 8/1999 | Long et al. | 380/273 |
| 6,122,665 | A | * | 9/2000 | Bar et al. | 709/224 |
| 6,166,650 | A | * | 12/2000 | Bruwer | 340/5.26 |
| 6,246,701 | B1 | * | 6/2001 | Slattery | 370/503 |
| 6,275,471 | B1 | * | 8/2001 | Bushmitch et al. | 370/248 |
| 6,275,588 | B1 | * | 8/2001 | Videcrantz et al. | 380/255 |
| 6,292,490 | B1 | * | 9/2001 | Gratacap et al. | 370/412 |
| 6,336,188 | B2 | * | 1/2002 | Blake-Wilson et al. | 713/171 |
| 6,904,522 | B1 | * | 6/2005 | Benardeau et al. | 713/156 |
| 6,985,511 | B2 | * | 1/2006 | Kanterakis et al. | 375/141 |
| 7,120,253 | B2 | * | 10/2006 | Ducharme et al. | 380/211 |
| 7,203,968 | B2 | * | 4/2007 | Asano et al. | 726/31 |
| 2002/0006202 | A1 | * | 1/2002 | Fruehauf et al. | 380/260 |
| 2002/0031126 | A1 | * | 3/2002 | Crichton et al. | 370/394 |
| 2002/0101442 | A1 | * | 8/2002 | Costanzo et al. | 345/723 |
| 2003/0003896 | A1 | * | 1/2003 | Klingler et al. | 455/411 |

OTHER PUBLICATIONS

H. Schulzrinne, S. Petrack; "RTP Payload for DTMF Digits, Telephony Tones and Telephony Signals", May 2000; RFC 2833; pp. 1-30; "http://tools.ietf.org/html/rfc2833".*

(Continued)

Primary Examiner—Carl Colin
(74) Attorney, Agent, or Firm—Larry T. Cullen

(57) ABSTRACT

A system for securely transmitting Real Time Protocol voice packets to a remote multimedia terminal adapter over an Internet protocol network. The system features an MTA (a local multimedia terminal adapter) having a key stream generator for generating a first key stream used for encrypting the voice packets. The remote multimedia terminal adapter receives and decrypts the voice packets. Also, the system includes a remote key stream generator for generating the first key stream in order to decrypt the encrypted voice packets and a packet decryptor decrypting the encrypted voice packets using the first key stream, wherein both key stream generators are capable of generating a second key stream to prevent reuse of any portion of the first key stream during the communication session.

12 Claims, 2 Drawing Sheets

OTHER PUBLICATIONS

H. Schulzrinne, S. Casner, R. Frederick, V. Jacobson; "RTP: A Transport Protocol for Real-Time Applications"; Jan. 1996; pp. 1-70; "http://www.ietf.org/rfc/rfc1889.txt".*

Xie Youxin, Chen Jin, Fu Changgeng; "Implementation of Coding And Encryption in Satellite Channel"; IEEE 1996; May 5-7, 1996 pp. 31-34.*

* cited by examiner

SYSTEM FOR SECURELY COMMUNICATING INFORMATION PACKETS

BACKGROUND OF THE INVENTION

The present invention relates generally to the field of internet protocol (IP) communications, and specifically to a system for securely delivering voice packets over an IP network.

Conventional stream ciphers for securely encrypting information in communication networks are well known. Stream ciphers, a class of encryption algorithms, may be employed to encrypt data. Encryption converts data into an unintelligible form, e.g., ciphertext, that cannot be easily understood by unauthorized users. The reverse process, known as decryption, converts encrypted content to its original form such that it becomes intelligible. Simple ciphers include a rotational shift of letters in the alphabet, the substitution of letters for numbers, and the "scrambling" of voice signals by inverting the sideband frequencies.

More complex ciphers work according to sophisticated computer algorithms that rearrange the data bits in digital information. In order to easily recover the encrypted information, the correct decryption key is required. The key is an algorithm that decodes the work of the encryption algorithm. The more complex the encryption algorithm, the more difficult it becomes to decode the communications without access to the key. Encryption algorithms are well known to those of ordinary skill in the art and need not be discussed in detail.

In internet protocol (IP) networks, there are various instances in which encryption may be employed. A user may wish to communicate voice packets over the Internet (VoIP) via a personal computer to a remote end user's personal computer, for example. Similarly, a head end (cable central office) may wish to transmit multimedia information to its consumers using RTP (Real Time Protocol). Advances in compression algorithms and computer processing power make it possible to support real time communication over packet networks. Protocols like RTP now provide end-to-end transport functions for multimedia transmissions. Typically, a user is coupled to an IP network via a telephony adapter (TA). In packet cable networks, a cable telephony adapter (CTA) or multimedia terminal adapter (MTA) may be employed. The MTA converts content such as voice or data into packets for transmission on the network, and converts received packets into digital or analog signals for use by the user. To implement a secure channel between two users in the IP network, the associated MTAs use the same keys and encryption ciphers.

One such stream cipher is RC4, which involves continuously generating a random key stream (of bytes) which is combined with original clear text data using an exclusive or (XOR) logic. Like various stream ciphers, however, RC4 requires that the same portion of a key stream must not be reused to encrypt multiple messages. Failure to meet this constraint will result in the encryption being more susceptible to unauthorized decryption. Furthermore, many stream ciphers require an external synchronization source which enables the sender and receiver key streams to be synchronized. In this manner, the cipher text can be decrypted at the remote location.

Within PacketCable, for example, time stamps (RTP) are used as a pointer (synchronization source) to the RC4 random stream of bytes. The RTP time stamp is a number (32 bit) contained within an RTP packet header which specifies the sampling instant of the first byte in the RTP packet. The sampling instant is derived from a clock which increases linearly in time, so the time stamp can be used for synchronization. Specifically for audio streams, $$RC4\ Key\ Stream\ Offset = Frame\ Number * Frame\ size$$

The frame number is the number of audio frames generated since the start of the stream and can be derived directly from the RTP time stamp. The Frame size is given in bytes.

$$Frame\ Number = (RTP\ Time\ stamp - RTP\ Initial\ Time\ stamp)/Nu$$

where Nu is the number of audio samples in an uncompressed frame of audio.

However, only some of the audio CODECs are frame-based; for example, the G.711 CODEC is sample-based, where an RTP packet can contain any number of samples. In the case of a sample-based CODEC, a virtual frame size can be assumed, where all RTP packets would contain a multiple of that frame size (even though the CODEC itself is not frame-based). For example, if RTP packets with the G.711 CODEC always contain 3, 6 or 9 samples, the virtual frame size could be assumed to be 3 samples (corresponding to 1-frame, 2-frame and 3-frame packets).

Equivalently, for both frame-based and sample-based audio CODECs the RC4 Key Stream Offset calculation can be based directly on the number of samples (instead of frames). In the formula below, sample size is specified in bytes:

$$RC4\ Key\ Stream\ Offset = Sample\ Number * Sample\ size$$

$$Sample\ Number = (RTP\ Time\ stamp - RTP\ Initial\ Time\ stamp)$$

One limitation of this invention is that it applies to fixed-rate audio CODECs only—if it is a variable-rate codec with a variable sample size, this encryption method does not apply.

Typically, CODECs (COder/DECoder) are employed for coding and decoding information into and from frames having information samples. Due to the variety of CODECs available in the industry, CODECs may implement different frame sizes. As noted, RTP time stamps are used as a synchronization source for the RC4 random stream of bytes The time stamp provides an indication of the number of audio frames processed and is typically a multiple of the frame size (plus a random initial value). However, during a communication session, if a CODEC change occurs, the frame size (as well as sample size) will also change so that the above formula can no longer be used to determine the RC4 key stream offset. Furthermore, the RTP timestamp is no longer a multiple of a new frame size. The net result of a CODEC change is that information cannot be decrypted at the receiving end.

Conventional techniques have been specified so that the time stamp continues to be a multiple of the new frame size after an audio change. One such technique is providing a formula for adjusting the timestamp, wherein an adjustment value is added to the time stamp in order to adjust the RC4 key stream. However, the adjustment value added to the time stamp depends on exactly which audio frame is being processed when the CODEC change is discovered. With the MGCP-based call signaling, each endpoint is controlled by a Call Agent (to which we also refer to as a Gateway Controller) and there is no guarantee that the two communicating endpoints will be notified (by their Call Agent) of the CODEC change at exactly the same time. Thus, a high probability exists that after the CODEC change the two MTAs would loose synchronization on their RC4 key streams and all RTP packets would not be decrypted.

A further problem relates to the receipt of identical RTP session synchronization source (SSRC) identifiers by a gateway terminating several voice connections, that is, in the event that two different sessions are assigned identical session identifiers. The RTP standard requires that each endpoint generating RTP session identifiers (SSRC) allow for the contingency that two identical SSRCs collide at a mixer or a bridge. If such a collision occurs, an RTP BYE message is employed to hang up one of the RTP sessions and a new one is restarted with a new SSRC value. Herein lies a problem similar to the above CODEC change problem. The sequence numbers and the timestamp sequence are both re-initialized which causes the re-use of portions of the previously used key stream and re-start with the same initial timestamp value.

Therefore, there is a need to resolve the aforementioned problem relating to the conventional approach for securely delivering voice packets over an IP network.

SUMMARY OF THE INVENTION

The present invention, in one embodiment, discloses a system for securely communicating information packets such as voice packets. An encryption algorithm is used to securely send the voice packets over a communication network that employs the Internet Protocol. Real Time Protocol (RTP), which supports real time transmission of multimedia information, is used to securely exchange the voice packets between a local and a remote location. A local key stream generator generates a first key stream used to encrypt the voice packets. In some instances, an entirely new key stream is generated to prevent reusing any portions of the first key stream as reuse facilitates decryption by unauthorized entities.

In an alternate embodiment, the present invention discloses a system for securely transmitting RTP voice packets. Transmission typically occurs during a communication session to a remote multimedia terminal adapter over an Internet protocol network. The system includes a local multimedia terminal adapter that receives the voice packets. The local multimedia terminal adapter has a local key stream generator for generating a first key stream, and a packet encryptor that encrypts the voice packets using at least a portion of the first key stream to form encrypted voice packets. A second key stream is generated when the system wishes to switch from a first to a second coder/decoder for compression/decompression of the voice packets.

The remote multimedia terminal adapter which receives the encrypted voice packets has a remote key stream generator for generating the first key stream in order to decrypt the encrypted voice packets. It further includes a packet decryptor for decrypting the encrypted voice packets using the first key stream. In should be observed that both key stream generators are capable of generating a second key stream to prevent reuse of any portion of the first key stream during the communication session.

In an alternate aspect, the present invention discloses a system for communicating RTP voice packets between a local and a remote location over an Internet protocol network. The system includes a stream cipher module for encrypting the voice packets. A key stream generator for generating a first RTP key stream is also included. The stream cipher module employs the first key stream to encrypt the voice packets for forwarding to the remote location. The key stream generator produces a second RTP key stream for encrypting the voice packets when the system wishes to switch from a first communication parameter to a second communication parameter.

In a further aspect, the present invention teaches a method for securely transmitting RTP voice packets from a local to a remote location via a communication network. The method includes the steps of generating a first RTP key stream for encrypting the voice packets and forwarding encrypted voice packets to the remote location. Other steps include generating a second RTP key stream for encrypting the voice packets in response to a request to change communication parameters for the same media stream and forwarding voice packets encrypted with the second RTP key stream to the remote location.

Furthermore, in a communication system that has a gateway receiving communication sessions from two or more multimedia terminal adapters, a further embodiment of the present invention is a method for securely exchanging voice packets between the multimedia terminal adapters and the gateway. The method consists of the steps of generating a first RTP key stream for encrypting the voice packets and forwarding the voice packets encrypted with the first RTP key stream to the gateway. Further steps include generating a second RTP key stream for encrypting the voice packets in response to a collision detection, wherein the multimedia terminal adapters have the same source identifier, and forwarding voice packets encrypted with the second RTP key stream to the remote location.

The present invention, in an alternate embodiment, discloses a system for securely transmitting voice packets during a communication session from a local location to a remote location over a communication network. The system contains a means for generating a first key stream at the local location and a means for encrypting the voice packets using at least a portion of the first key stream to form encrypted voice packets. Other components are a means for forwarding the encrypted voice packets from the local location to the remote location and a means for generating the first key stream at the remote location in order to decrypt the encrypted voice packets. A means for decrypting the encrypted voice packets using the first key stream is further included. Both means for generating are capable of generating a second key stream to prevent reuse of any portion of the first key stream during the communication.

DETAILED DESCRIPTION OF THE INVENTION

A first embodiment of the present invention discloses a system for securely communicating information packets such as voice packets. The voice packets are securely sent using an encryption algorithm over a communication network which employs the Internet Protocol. Recent advances in compression algorithms and computer processing power make it possible to support real time communication over such packet networks. Using the Real Time Protocol (RTP), the voice packets are securely exchanged between a local and a remote location. A local key stream generator generates a first key stream used to encrypt the voice packets. In some instances, an entirely new key stream is generated to prevent reusing any portions of the first key stream because reuse facilitates decryption by unauthorized entities.

These and various other aspects of the present invention are described with reference to the diagrams that follow. While the present invention will be described with reference to an embodiment that regenerates a new key stream based on a CODEC change, one of ordinary skill in the art will realize that other types of changes such as source identifier (SSRC) and message access (MAC) algorithm changes, for example, are applicable.

Moreover, embodiments of the present invention use key-based encryption techniques as a mechanism for achieving secure communication in the IP network. Such embodiments are not limited to using any one encryption technique, and, therefore, it is possible to construct embodiments of the present invention using several types of encryption techniques. Further, the invention is not limited to using multimedia adapters (MTAs) and may, in fact, be implemented using any other adapters as required by a particular network.

Figure 1:
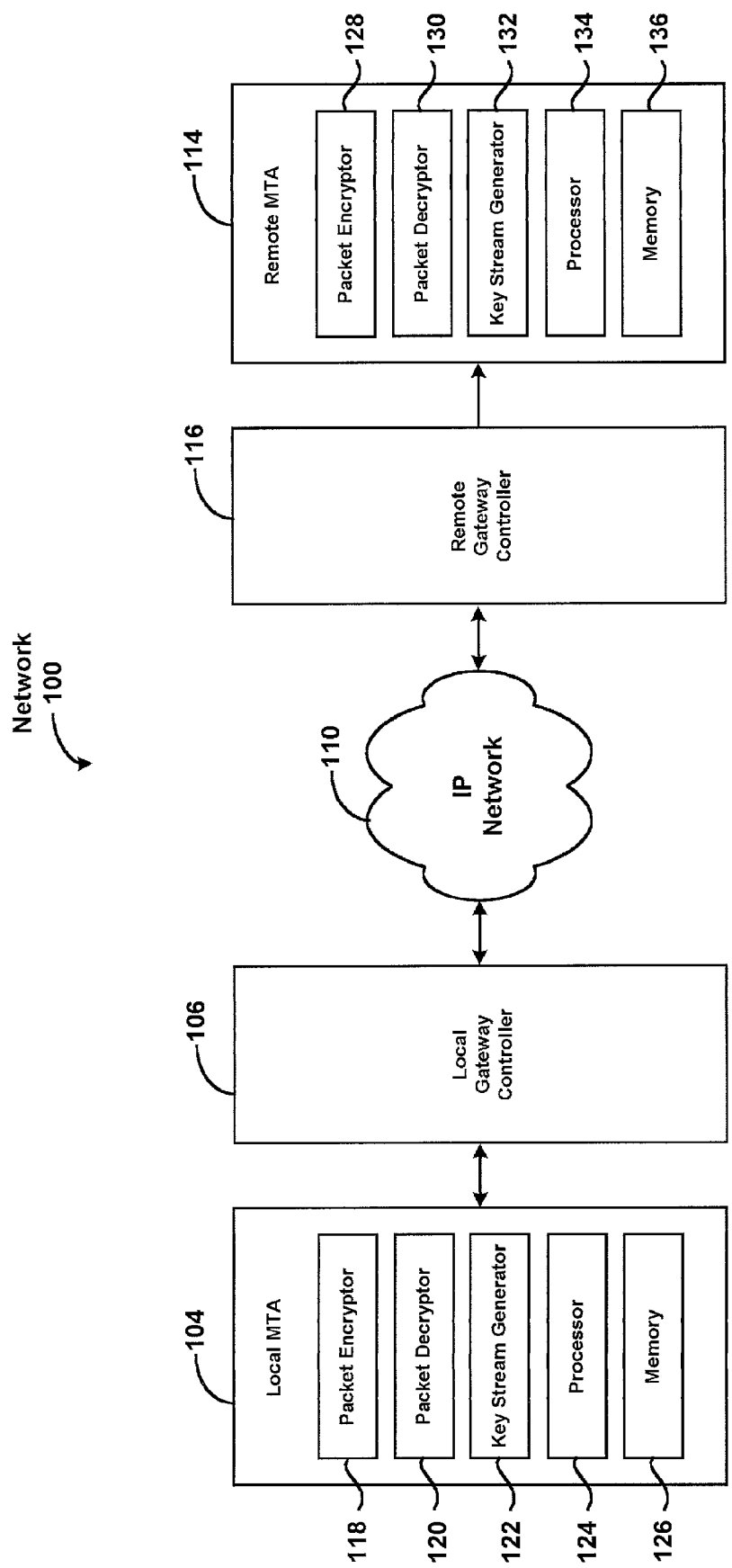
FIG. 1 is a block diagram of a network for securely communicating voice packets in accordance with a first embodiment of the present invention.

FIG. 1 is a block diagram of a network 100 for securely communicating voice packets in accordance with a first embodiment of the present invention.

In FIG. 1, among other components, network 100 comprises a local MTA 104 for converting content into packets, a local gateway controller 106 for processing and routing messages exchanged between MTA 104 and various components of an IP network 110 that function to distribute messages using the Internet Protocol via a world wide interconnection of computer systems. Other components of network 100 are a CODEC (not shown) for encoding/decoding encrypted data into and from frames, a remote gateway controller 116 for processing messages exchanged between a remote MTA 114 and other components of IP network 110, and remote MTA 114 for converting encrypted voice packets into content at the remote end. As used herein, a CODEC is an encoding/decoding algorithm required at both the transmitting and receiving ends, and may by implemented as either software, hardware or a combination of both. The same CODEC must be employed at both ends to successful encrypt/decrypt voice packets.

Local MTA 104 comprises among other components, a packet encryptor 118 for encrypting packets of information, a packet decryptor 120 for decrypting packets of information, a key stream generator 122 for generating key streams for the encryption/decryption process, a processor 124 for performing and/or controlling operations relating to MTA 104, and a memory 126 for storing data. Remote MTA 114 comprises a packet encryptor 128, a packet decryptor 130, a key stream generator 132, a processor 134 and a memory 136, all of which perform functions equivalent to those performed by similar components within local MTA 104.

Although not shown, one of ordinary skill in the art will understand that one or more MTA components may be implemented outside the MTAs. Furthermore, all of the components in FIG. 1 are implementable using software, hardware or a combination of both. MTA 104 may be implemented using a general purpose DSP (digital signal processor), for example. It should be observed that the present embodiment employs RTP to provide real time communication of the voice packets.

In operation, a user wishing to employ MTA 104 to transmit RTP voice packets begins by initiating MTA 104 via a user interface (not shown). In response, processor 124 notifies local controller 106 regarding the connection request In turn, local controller 106 signals remote gateway controller 116 through IP network 110. Remote controller 116 notifies remote MTA 114 which returns an acknowledgment signal to MTA 104 by using the reverse of the above-described steps. In a first embodiment, to establish a secure channel, the processors direct key stream generators 122, 132 to each produce one-half of a decryption key; the key halves are forwarded to gateway controllers 106, 116 to form a single key.

Once a secure channel is established, the process of exchanging voice packets is initiated. To begin, voice samples which are assembled into voice packets by MTA 104 are received. Thereafter, processor 124 coordinates with key stream generator 122 to begin generating a key stream based on a single key. Upon generation of the key stream, encryptor 118 encrypts each voice packet using the key stream. As noted, time stamps are employed to perform synchronization so the voice packets are recoverable at the remote end. Each voice packet includes an RTP time stamp used as a pointer to the key stream. Encryptor 118 employs the RTP time stamp to calculate an index into the key stream, and thereafter, calls key stream generator 122 to get the appropriate key stream bytes for encryption.

Preferably, a stream cipher such as RC4 is employed although other comparable stream ciphers which require an external synchronization source may be used. In one embodiment, RC4 involves the XOR (Exclusive OR) of the voice packet bits and the key stream to produce encrypted data. After the encrypted data stream is received, processor 134 (of remote MTA 114) directs key stream generator 132 to output the same key stream bytes from the same key stream that was used to encrypt the voice packets at the local end. The key stream generator either generates the key stream bytes on-demand, or is free running based on the MTA clock and has the key stream bytes available by the time the RTP packet is received.

Next, packet decryptor 130 XORs the key stream bytes with the encrypted data to recover the voice packets. The RTP time stamp is always incrementing to point to a unique place in the key stream such that packet decryptor 130 recovers the encrypted data. The present invention ensures that the key stream bytes are never repeated and thus enables secure communication of voice packets, even if a CODEC change or an SSRC collision occurs as further described with reference to FIG. 2. As used herein a "time stamp" is any mechanism for performing synchronization for a cipher in order to attain decryption of encrypted data.

Figure 2:
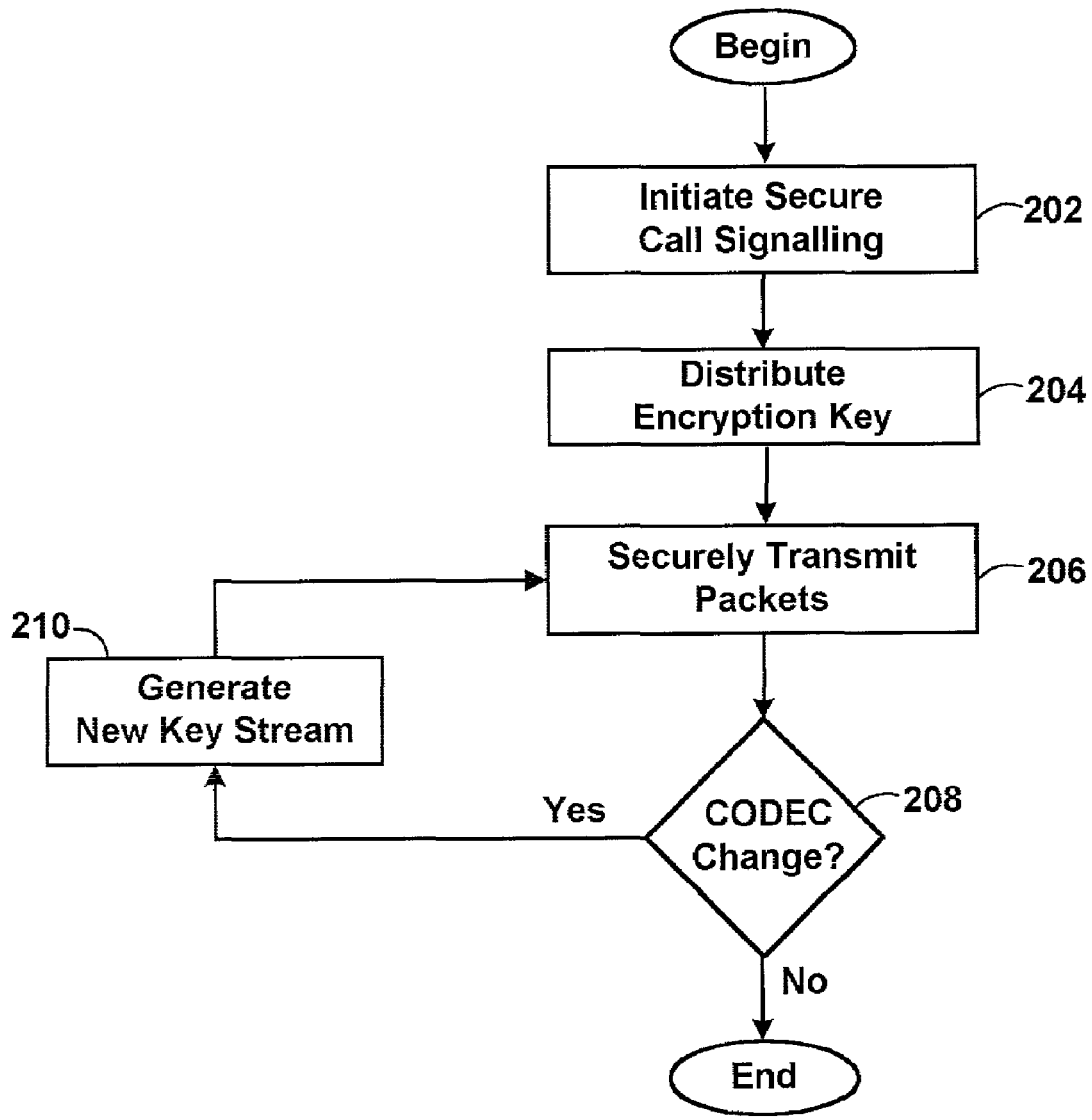
FIG. 2 is a flow diagram of the process for securely communicating voice packets in accordance with an alternate embodiment of the present invention.

FIG. 2 is a flow diagram 200 of the process for securely communicating voice packets in accordance with an alternate embodiment of the present.

Specifically, the process for continuing secure voice communication when a CODEC change or SSRC collision occurs is shown.

At block 202, secure call signaling between local gateway controller 106 and remote gateway controller 116 and their associated MTAs gateway controller is established.

At block 204, a key for ensuring a secure communication channel is distributed to MTA 104 and 114.

At block 206, voice packets are encrypted using a key stream based on the key, after which the encrypted voice packets are forwarded to the remote MTA 114.

At decision block 208, if MTA 104, for example, decides to change the CODEC, it signals the CODEC change to gateway controller 106. MTA 104 generates a new set of RTP key stream and a new initial time stamp. Herein lies a first advantage of the present invention. The related art provides for re-derivation of the RTP key stream when a CODEC change occurs, by providing the following key derivation function.

$$F(S, \text{"End-End RTP Key Change <N>"})$$

where N is a counter that holds the number of times that the time stamp has wrapped around.

F( ) is a one-way pseudo-random function used for the purpose of key derivation. Given only the result of F(S, Label), where Label is known, it is not possible using reasonable computing power to calculate the inverse and determine S.

S is a shared secret—a random value shared between the two endpoints and is known only to those two endpoints and possibly a trusted server (e.g. gateway controller).

"End-End RTP Key Change <N>" is a label that is used as a parameter to the key derivation function F( ). <N> stands for an ASCII representation of a decimal number, representing a counter. For example, the initial rekeying (e.g. due to a codec change) would use "End-End RTP Key Change 1", next one would be "End-End RTP Key Change 2", etc. The exact value or format of this label or the starting value of the counter is not important. This label changes with each codec change. Each time the label changes, the function F( ) produces a new pseudo-random set of keys, unpredictably different from the previous set.

Unlike the related art, a first embodiment of the present invention simply generates a new set of keys by re-executing the above key derivation function to start a whole new RC4 key stream when a CODEC change occurs. Because N is incremented with each CODEC change, a new pseudo-random set of keys will be re-derived after each CODEC change. Advantageously, the present invention provides a continuing high level of security by avoiding the reuse of any portions of the first key stream by generating an entirely new key stream for the same media stream.

In an alternate embodiment, the following function is used to derive a new set of keys:

F(S, SSRC, "End-End RTP Key Change <N>") where:

N is the counter of the number of key changes for the current SSRC; and

SSRC is the synchronization source session identifier.

When SSRC is changed, counter N is reset back to 0 (or some other initial value). If a CODEC change is conducted without changing SSRC, then the counter N is incremented. In this fashion, because either the SSRC or counter N is changed before each rekeying, this function derives a new set of keys. Upon deriving the new set of keys, MTA 104 starts transmitting with the new set of keys. MTA 104 receives the packets with the new CODEC with the new set of keys and may optionally keep the old keys for a short period to receive packets that are still using the old CODEC. This would avoid a glitch during the transition period. Gateway controller 106 signals the CODEC change to remote controller 116, which signals it to the remote MTA 114. Remote MTA 114 gets the CODEC change notification and also generates a new set of RC4 keys and a new initial time stamp all of which are the same as the ones generated by the other MTA.

Remote MTA 114 starts transmitting with the new set of keys. Remote MTA 114 receives packets with the new CODEC with the new set of keys. Similarly, remote MTA 114 also may optionally keep the old keys for a short period to receive packets that are still using the old CODEC. This, too, would avoid a glitch during the transition period.

Although not shown, the above solution may be employed to resolve the SSRC collision problem. Where a voice gateway terminates voice connections from two or more MTAs, the same SSRC has been assigned to the two sessions, and the gateway detects a collision, RTP protocol requires that one MTA restart a new session with a new session ID. When a new session is started, the time stamp sequence is essentially restarted which causes reuse of portions of the previously used key stream. Unlike conventional systems that attempt to adjust the key stream, the present invention derives a new key stream in a manner similar to that disclosed for the CODEC change above. It should be observed that if the time stamp is not re-initialized after an SSRC collision, the same key stream can continue to be used.

In a further embodiment, the above solution is employed for a MAC (Message Authentication Code) algorithm change, resulting in a packet size change. Traditionally, for convenience the same RC4 key stream may be used in the generation of the keying material needed to calculate a MAC for each packet (a MAC is appended after the encrypted text).

For example, additional key stream bytes may be allocated to calculate a MAC for each frame. However, there is only one MAC needed for the whole RTP packet and if an RTP packet contains multiple frames only the key stream bytes allocated to one of the frames (e.g. the last one) will actually be used in the MAC calculation:

RC4 Key Stream Offset=Frame Number*(Frame size+MAC pad)

Where the MAC pad is a key used to generate the MAC, for one-time use only.

So, where a key stream is used for MAC generation (instead of or in addition to encryption) and the size of that random pad changes, one must rekey and start a new RC4 key stream in the same way as for CODEC changes. In this fashion, the present invention and its embodiments provide a system for securely communicating voice packets using a stream cipher.

While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A system for securely transmitting Real Time Protocol voice packets during a communication session with a remote multimedia terminal adapter over an Internet protocol network, the system comprising:

a local multimedia terminal adapter receiving the voice packets having a time stamp synchronization source operable to synchronize cryptographic operations between said local multimedia terminal adapter and said remote multimedia terminal adapter, the local multimedia terminal adapter comprising, a local key stream generator for generating a first key stream; and a packet encryptor that encrypts the voice packets using at least a portion of the first key stream to form encrypted voice packets;

the remote multimedia terminal adapter receiving the encrypted voice packets, the remote multimedia terminal adapters further comprising, a remote key stream generator for generating the first key stream in order to decrypt the encrypted voice packets; and a packet decryptor decrypting the encrypted voice packets using the first key stream, wherein both key stream generators generate a second key stream when a component used to transmit the Real Time Protocol voice packets changes during the communication session and the packet encryptor and packet decryptor use the second key stream, wherein the second key stream is generated when the system switches from a first to a second coder/decoder for compression/decompression of the voice packets.

2. The system of claim 1 wherein the second key stream is generated when a Message Authentication Code algorithm change occurs.

3. The system of claim 1 further comprising a local gateway controller for forwarding the encrypted packets through the Internet protocol network.

4. The system of claim 1 further comprising a remote gateway controller for receiving the encrypted packets from the Internet protocol network and for forwarding encrypted voice packets to the remote multimedia terminal adapter.

5. A system for communicating Real Time Protocol voice packets between a local and a remote location over an Internet protocol network, the system comprising:
a stream cipher module for encrypting the voice packets; and
a key stream generator device for generating a first Real Time Protocol key stream, the stream cipher module employing the first key stream to encrypt the voice packets for forwarding to the remote location, the key stream generator device producing a second Real Time Protocol key stream for encrypting the voice packets when the system switches from a first communication parameter to a second communication parameter, each of the first and second parameters being involved in the synchronization of the key stream, wherein the voice packets have a time stamp synchronization source operable to synchronize cryptographic operations between said local and remote locations, wherein the first communication parameter is a first coder/decoder that compresses/decompresses the voice packets, and the second communication parameter is a second coder/decoder that compresses/decompresses the voice packets.

6. The system of claim 5 further comprising a new time tamp sequence generated when the second Real Time Protocol key stream is generated.

7. The system of claim 5 wherein the second key stream is generated by re-executing the following key derivation function:

$$F(S, \text{"End-End RTP Key Change <N>"}) \text{ where:}$$

N is a counter incremented whenever a new set of Real Time Protocol keys is re-derived for the same media stream session;
F( ) is a one-way pseudo-random function used for the purpose of key derivation;
S is a shared secret which includes a random value shared between the two endpoints and is known only to those two endpoints or a trusted server; and
"End-End RTP Key Change <N>" is a label that is used as a parameter to the key derivation function F( ), <N> stands for an ASCII representation of a decimal number, representing a counter.

8. The system of claim 5 wherein the second key stream is generated by re-executing the following key derivation function:

$$F(S, SSRC, \text{"End-End RTP Key Change <N22 "}) \text{ where:}$$

S is a shared secret which includes a random value shared between the two endpoints and is known only to those two endpoints or a trusted server;
SSRC is the synchronization source session identifier;
N is the counter of the number of key changes for the same SSRC value; and
"End-End RTP Key Change <N>" is a label that is used as a parameter to the key derivation function F( ), <N> stands for an ASCII representation of a decimal number, representing a counter.

9. A system for securely transmitting voice packets during a communication session from a local location to a remote location over a communication network, the system comprising:
a means for generating a first key stream at the local location;
a means for encrypting the voice packets using at least a portion of the first key stream to form encrypted voice packets;
a means for forwarding the encrypted voice packets from the local location to the remote location;
a means for generating the first key stream at the remote location in order to decrypt the encrypted voice packets; and
a means for decrypting the encrypted voice packets using the first key stream, wherein both means for generating are capable of generating a second key stream when a component used to transmit the Real Time Protocol voice packets changes during the communication session, wherein the voice packets have a time stamp synchronization source operable to synchronize cryptographic operations between said local and remote locations,
wherein the second key stream is generated when the system switches from a first to a second coder/decoder for compression/decompression of the voice packets.

10. The system of claim 9 wherein the second key stream is generated by re-executing the following key derivation function:

$$F(S, \text{"End-End RTP Key Change <N>"}) \text{ where:}$$

N is a counter incremented whenever a new set of Real Time Protocol keys is re-derived for the same media stream session;
F( ) is a one-way pseudo-random function used for the purpose of key derivation;
S is a shared secret which includes a random value shared between the two endpoints and is known only to those two endpoints or a trusted server and
"End-End RTP Key Change <N>" is a label that is used as a parameter to the key derivation function F( ), <N> stands for an ASCII representation of a decimal number, representing a counter.

11. The system of claim 9 wherein the second key stream is generated by re-executing the following key derivation function:

$$F(S, SSRC, \text{"End-End RTP Key Change <N>"}) \text{ where:}$$

S is a shared secret which includes a random value shared between the two endpoints and is known only to those two endpoints or a trusted server;
SSRC is the synchronization source session identifier;
N is the counter of the number of key changes; and
"End-End RTP Key Change <N>" is a label that is used as a parameter to the key derivation function F( ), <N> stands for an ASCII representation of a decimal number, representing a counter.

12. The system of claim 9 further comprising a means for synchronizing the voice packets.

* * * * *